United States Patent
de Lajudie et al.

(10) Patent No.: US 11,130,179 B2
(45) Date of Patent: Sep. 28, 2021

(54) METHOD FOR MANAGING A POWDER IN AN ADDITIVE MANUFACTURING FACILITY COMPRISING A PLURALITY OF MACHINES

(71) Applicant: COMPAGNIE GENERALE DES ETABLISSEMENTS MICHELIN, Clermont-Ferrand (FR)

(72) Inventors: Christophe de Lajudie, Clermont-Ferrand (FR); Jean-Luc Petitjean, Clermont-Ferrand (FR); Christian Geay, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/822,247

(22) Filed: Mar. 18, 2020

(65) Prior Publication Data

US 2020/0230698 A1    Jul. 23, 2020

Related U.S. Application Data

(62) Division of application No. 15/549,233, filed as application No. PCT/EP2016/053198 on Feb. 15, 2016, now abandoned.

(30) Foreign Application Priority Data

Feb. 16, 2015  (FR) ...................... 1551277

(51) Int. Cl.
*B22F 12/00* (2021.01)
*B29C 64/153* (2017.01)
(Continued)

(52) U.S. Cl.
CPC .............. *B22F 12/00* (2021.01); *B22F 10/68* (2021.01); *B22F 10/73* (2021.01); *B22F 12/82* (2021.01);
(Continued)

(58) Field of Classification Search
None
See application file for complete search history.

(56) References Cited

U.S. PATENT DOCUMENTS 7,296,599 B2   11/2007   Cox
7,887,316 B2    2/2011   Cox
(Continued)

FOREIGN PATENT DOCUMENTS

DE        20107262 U1    8/2001
DE    102011088158 A1    6/2013
(Continued)

OTHER PUBLICATIONS

JP 2006-248231 A, US 2006/0214335 A1 US 2009/0169664 A1 US 7,887,316 B2, US 7,887,316 B2 was cited in Mar. 18, 2020 Information Disclosure Statement.
(Continued)

*Primary Examiner* — Nicholas A Wang
*Assistant Examiner* — Michael J Kachmarik
(74) *Attorney, Agent, or Firm* — Venable LLP (57) ABSTRACT

An additive-manufacturing facility and a method for managing a powder transported to and from additive-manufacturing machines of the facility are provided. According to the method, a volume of feedstock powder is stored, and the machines are automatically fed with powder from the volume of feedstock powder. For each machine, the powder fed to the machine undergoes at least one layering operation during an additive-manufacturing cycle, and excess powder in the layering operation is moved away and conveyed from the machine to the volume of feedstock powder. For each machine, recovered powder, which is derived from cleaning rough components produced by the machine, is reintroduced into the volume of feedstock powder. A same collection
(Continued)

circuit is used to convey the excess powder and the recovered powder to the volume of feedstock powder.

17 Claims, 2 Drawing Sheets

(51) Int. Cl.
    *B29C 64/35*      (2017.01)
    *B29C 64/357*     (2017.01)
    *B22F 10/73*      (2021.01)
    *B22F 10/68*      (2021.01)
    *B22F 12/82*      (2021.01)
    *B33Y 10/00*      (2015.01)
    *B33Y 30/00*      (2015.01)
    *B33Y 40/00*      (2020.01)
    *B22F 10/10*      (2021.01)

(52) U.S. Cl.
    CPC ............ *B29C 64/153* (2017.08); *B29C 64/35* (2017.08); *B29C 64/357* (2017.08); *B33Y 10/00* (2014.12); *B33Y 30/00* (2014.12); *B33Y 40/00* (2014.12); *B22F 10/10* (2021.01); *Y02P 10/25* (2015.11)

(56) References Cited

U.S. PATENT DOCUMENTS

| | | |
|---|---|---|
| 2001/0045678 A1 | 11/2001 | Kubo et al. |
| 2006/0214335 A1 | 9/2006 | Cox |
| 2008/0006334 A1* | 1/2008 | Davidson ............... B33Y 30/00 137/571 |
| 2009/0169664 A1 | 7/2009 | Cox |
| 2014/0363585 A1 | 12/2014 | Pialot et al. |
| 2015/0139849 A1 | 5/2015 | Pialot, Jr. et al. |
| 2015/0298397 A1* | 10/2015 | Chen ..................... B29C 64/357 209/12.2 |
| 2017/0304897 A1 | 10/2017 | Walrand et al. |

FOREIGN PATENT DOCUMENTS

| | | |
|---|---|---|
| JP | 2001-334583 A | 12/2001 |
| JP | 2006-248231 A | 9/2006 |
| WO | 2013/092757 A1 | 6/2013 |
| WO | 2013/178825 A2 | 12/2013 |

OTHER PUBLICATIONS

JP 2001-334583 A, US 2001/0045678 A1.
DE 20107262 U1, Cited in Mar. 18, 2020 Information Disclosure Statement.
Feb. 3, 2020 Japanese Official Action in Japanese Patent Appln. No. 2017-561038.
Apr. 29, 2016 International Search Report and Written Opinion in International Patent Appln. No. PCT/EP2016/053198.
"Dense Phase Pneumatic Conveying Systems," Dynamic Air Conveying Systems, 2001, pp. 1-18.
Sharon Novak, et al., "Pneumatic Vacuum Conveying of Pharmaceutical Powders," Powder/Bulk Solids, Jan. 4, 2012, pp. 1-6.
David Mills, "Pneumatic Conveying Design Guide," 2nd Edition, Elsevier, 2004, pp. 1-28.
"Vibroscreen Circular Vibratory Screeners," Kason Corporation. Jun. 17, 2012, pp. 1-14.
Tote, Bulk Sotrage Tnaks Meet Secondary-Containment and Spill-Containment Regulations, Tote Systems (via the Wayback Machine), Feb. 25, 2013, p. 1.

* cited by examiner

METHOD FOR MANAGING A POWDER IN AN ADDITIVE MANUFACTURING FACILITY COMPRISING A PLURALITY OF MACHINES

This application is a division of application Ser. No. 15/549,233 filed Aug. 7, 2017, which was the National Stage of International Patent Appln. No. PCT/EP2016/053198 filed Feb. 15, 2016.

The invention falls within the field of powder-based additive manufacturing in which particles of this powder are sintered or melted using a high-energy beam of electromagnetic radiation, such as, for example, a laser beam, and/or a particle beam, for example an electron beam.

RELATED ART

More specifically, the invention relates to the management of a powder within an additive manufacturing facility comprising a plurality of additive manufacturing machines, this management comprising at least feeding the various machines with powder and recycling the powder layering excess generated by the additive manufacturing operations taking place within each machine.

Within the context of powder-based additive manufacturing, a component is manufactured by consolidating this powder according to a predetermined pattern, layer after layer, using a high-energy beam and/or a particle beam. Hence, an additive manufacturing machine comprises at least means of emitting a laser beam and/or a particle beam, a device for layering powder in the working zone of the laser and/or particle beam, and means feeding the layering device with powder.

For example, in the additive manufacturing machines described in documents WO-2013/178825 and WO-2013/092757, the layering device comprises powder spreading means able to travel over the working zone so as to distribute the powder into a layer of a final thickness suited to the additive manufacturing, feed means able to transfer the powder under gravity to the spreading means and metering means able to control the quantity of powder transferred to the spreading means. It is precisely the means of spreading the powder and the principle by which they operate that cause the powder layering excess generated by each machine during an additive manufacturing cycle. Specifically, in order to obtain layers of powder of uniform thickness, these spreading means deposit a layer of powder of a thickness greater than the thickness required, then the excess thickness of powder deposited is removed by sweeping with a roller or a scraper. At the same time, in these documents WO-2013/178825 and WO-2013/092757, the storage means comprise at least one mobile hopper able to move with the feed means, the metering means and the spreading means.

According to a first method, the hopper of the feed means may be filled with powder manually by an operator before each additive manufacturing cycle.

From an industrial standpoint, this manual first method is hardly attractive because it does not allow the machine feed means to be restocked as a parallel process, the machine needing to be shut down in order to allow the operator to access the hopper of the feed means.

In addition, and despite all common precautions, such manual restocking of the machines subjects the operator to risks of inhaling powder when certain powders used in additive manufacturing may contain toxic substances.

So, a better solution is to automate the restocking with powder of the feed means of a layering device of an additive manufacturing machine. This is what is provided for, for example, in documents U.S. Pat. Nos. 7,296,599 and 7,887,316.

In more detail, in these documents U.S. Pat. Nos. 7,296,599 and 7,887,316, provision is made for one or several additive manufacturing machines to be restocked automatically with fresh powder and/or with powder referred to as recovered powder because it is derived from the cleaning of the components produced beforehand by additive manufacture and of the support on which they were manufactured.

Strangely, while these documents U.S. Pat. Nos. 7,296,599 and 7,887,316 make provision for one or more additive manufacturing machines to be restocked automatically from one and the same external restocking device known as a "powder processing unit", neither of these two documents specifies in concrete terms how a restocking circuit connecting the external restocking device to several additive manufacturing machines is arranged.

Document U.S. Pat. No. 7,296,599 is more specifically concerned with the pneumatic transportation of fresh powder from a storage container to the "powder processing unit". In that document U.S. Pat. No. 7,296,599, pneumatic carriage of fresh powder is performed by discharging the powder using compressed air.

Such transportation using compressed air is a disadvantage when it is toxic powders that are being transported, because in the event of a leak in the transport circuit, the compressed air will automatically expel the particles of toxic powder to outside the circuit, where the air pressure is not as high and where there is a likelihood that the particles of toxic powder will be inhaled by operators or other individuals situated nearby.

In addition, because document U.S. Pat. No. 7,296,599 makes no provision for treating the air used for transporting the fresh powder, the water contained in this air is liable to moisten the powder, and this may detract from the quality of the components subsequently manufactured with this powder.

For its part, document U.S. Pat. No. 7,887,316 more specifically targets the recycling of the powder used during each additive manufacturing cycle.

On the one hand, this document U.S. Pat. No. 7,887,316 makes provision for the powder layering excess, also referred to as excess powder, to be recycled directly inside an additive manufacturing machine by returning this excess powder directly, via a dense-phase transport device, to the means that feed the layering device of this machine.

This document U.S. Pat. No. 7,887,316 specifies that transportation in the dense phase is transportation of the powder with a gas flowing at a low speed of between 5 and 10 m/s, as opposed to transportation in the dilute phase which is performed using a gas circulating at a high speed of between 20 and 30 m/s.

Although it allows some of the powder used during an additive manufacturing cycle to be recycled, the internal recycling described in this document U.S. Pat. No. 7,887,316 makes no provision for an operation of checking the granulation of the excess powder before it is reused. Now, this excess powder may contain particles of powder that have agglomerated during the consolidation of a previous layer of powder, and these agglomerates of powder may detract from the quality of the parts later manufactured using this excess powder.

At the same time, the means of implementing this internal recycling are a source of vibrations and of impurities liable to impede the correct operation of the machine and of its powder layering device.

Finally, the means for implementing this internal recycling represent an additional material cost per machine, which additional cost would be all the higher if this internal recycling incorporated means of checking the granulation of the excess powder.

Furthermore, this document U.S. Pat. No. 7,887,316 also makes provision for reusing the recovered powder derived from the cleaning of the manufactured components and of their manufacturing support by mixing this recovered powder with fresh powder and by redistributing this pulverulent mixture to the additive manufacturing machines.

Like document U.S. Pat. No. 7,296,599, this document U.S. Pat. No. 7,887,316 makes no provision for checking the granulation of the mixture of powders before it is reused.

However, document DE-201 07 262, cited in this document U.S. Pat. No. 7,887,316, makes provision for the excess powder and the recovered powder to be sifted before mixing them with fresh powder and reusing this mixture in an additive manufacturing machine.

Next, and like with the recycling of the excess powder, this document U.S. Pat. No. 7,887,316 makes provision for the recovered powder to be transported in dense phase when it is being recycled.

According to this document U.S. Pat. No. 7,887,316, transportation in the dense phase is considered to be more productive because its implementation requires less air to be displaced than transport in the dilute phase.

However, transportation in the dense phase may prove to be problematic in the case of a highly dense metallic powder, because blockages of powder may easily form in the ducts of the conveying circuit due solely to the low flow rate of air being used. In addition, if the blockage breaks up and forms a bed of powder in the transport duct, the low air flow rate will not make it possible to move this bed of powder.

According to another disadvantage, transportation in the dense phase does not allow the powder to be transported over long distances, something which may prove necessary in the case of a facility or workshop comprising a plurality of additive manufacturing machines.

At the same time and even if this document U.S. Pat. No. 7,887,316 envisages the use of an inert carrier gas such as nitrogen, argon, or carbon dioxide, this document U.S. Pat. No. 7,887,316 also indicates that the carrier gas used is preferably air, but without specifying any particular treatment to be performed on the air used for carrying the powder. Therefore, water contained in this untreated air may moisten the powder being transported and lead to the manufacture of poor-quality components.

Finally, neither of documents U.S. Pat. Nos. 7,296,599 or 7,887,316 makes provision for a treatment aimed at mastering the moisture content of powder, whether this be recycled powder and/or fresh powder, whereas a damp powder may also lead to the manufacture of components of poor quality.

While document DE-201 07 262 makes provision for centralizing the recycling of the excess and recovered powders, it disadvantageously multiplies the circuits used for collecting and distributing the various powders, thereby increasing the risks of powder leakage and therefore health risks, and making servicing and maintaining the facility more complex.

BRIEF DESCRIPTION OF EMBODIMENTS OF THE INVENTION

It is an objective of the invention to alleviate at least one of the disadvantages of the devices described in these prior art documents.

To this end, one subject of the invention is a method for managing a powder within an additive manufacturing facility comprising a plurality of additive manufacturing machines, the management method making provision for storing a volume of feedstock powder and for automatically feeding the various machines of the facility with powder from this volume of feedstock powder, the powder delivered to each machine undergoing at least one layering during an additive manufacturing cycle implemented in this machine, and this layering operation taking place with powder being deposited in excess and the excess portion of the powder deposited, referred to as excess powder, being moved away, the management method making provision for the excess powder moved away within each machine of the facility to be collected and the excess powder collected to be conveyed from each machine to the volume of feedstock powder, the management method also making provision for a recovered powder derived from the cleaning of the rough components manufactured by the machines of the facility to be reintroduced into the volume of feedstock powder. According to the invention, the management method is characterized in that it makes provision for one and the same collection circuit to convey the excess powder and the recovered powder as far as the volume of feedstock powder.

By virtue of this pooling of the collection of the excess powder, there is no longer any need for each additive manufacturing machine to be equipped with an internal recycling device which is a nuisance source of vibrations and of impurities, and which increases the cost of each machine. In addition, by pooling the collection of the excess powder and of the recovered powder, it is also possible to centralize the treatment of these powders prior to their reuse. In general, the pooling of the collection of the various powders reduces the cost of the facility and the risks of powder leakage, and makes the installation easier to maintain.

In order to avoid any leak of collected powder to outside the circuit used for transporting it, the management method makes provision for the excess powder and the recovered powder to be transported pneumatically and under vacuum as far as the volume of feedstock powder.

For preference, the management method also makes provision for the powder collected to be transported in diluted phase as far as the volume of feedstock powder so as to avoid blockages appearing in the circuit used for transporting the collected powder.

In the context of implementation of the feeding of powder to the various machines from the volume of feedstock powder, the management method provides powder transportation under gravity or pneumatically and under vacuum. This then avoids the risks of powder leakages that might be associated with the use of compressed air in the circuit conveying the powder from the volume of feedstock powder to the various machines.

For preference, the pneumatic and vacuum transport of the powder between the volume of feedstock powder and the various machines is done using dry air or an inert gas, in order to avoid moistening the powder transported.

To supplement the pooling of the collection of the excess powder and of the recovered powder, the management method also makes provision for the steps aimed at preparing the powder before it is distributed to the machines and used by these machines to be centralized. More specifically, the management method preferably makes provision for the powder to be dried and sifted upstream of its distribution to the various machines of the facility, namely between the volume of feedstock powder and each machine of the facility.

Finally, the management method also makes provision for fresh powder to be introduced into the volume of feedstock powder, this fresh powder being mixed with the excess powder collected and with the recovered powder, and therefore dried and sifted at the same time as these recycling-derived powders.

Another subject of the invention is a facility for implementation of this management method, this facility comprising a plurality of additive manufacturing machines, a device for storing a volume of feedstock powder and a feed device automatically feeding the various machines of the facility with powder from this volume of feedstock powder, each additive manufacturing machine comprising a device for layering the powder delivered to this machine, and each layering device of each machine depositing the powder in excess and moving away the excess portion of the powder deposited, referred to as the excess powder, the facility comprising a collection circuit for the excess powder moved away by each layering device of each machine, this collection circuit allowing the excess powder collected from each machine to be transported as far as the volume of feedstock powder, and the facility further comprising a cleaning device for cleaning the rough components manufactured by the machines of the facility and allowing a powder, referred to as recovered powder, to be recovered during the cleaning of these components. According to the invention, the facility is characterized in that the cleaning device is connected to the collection circuit that collects the excess powder, so that the recovered powder is introduced into this collection circuit.

For preference, the collection circuit comprises a single collecting duct connecting each machine of the facility to the volume of feedstock powder and vacuum generating means making it possible to transport the excess powder collected pneumatically and under vacuum in this collecting duct.

For preference also, the vacuum generating means allow the excess powder collected to be transported in a dilute phase in the collecting duct.

In greater detail, in a facility according to the invention, the feed device comprises a first, powder-preparation, circuit, followed by a second, powder-distribution, circuit distributing the prepared powder to the various machines of the facility, the preparation circuit connecting the volume of feedstock powder to the distribution circuit, and the distribution circuit connecting the preparation circuit to each machine of the facility.

For preference, at least one portion of the preparation circuit is set out in such a way as to transport the powder under gravity, and the preparation circuit also comprises vacuum-generating means allowing the powder to be transported pneumatically and under vacuum in at least one portion of this preparation circuit.

For preference also, the distribution circuit comprises a distribution duct connected to the preparation circuit and to each machine of the facility, and vacuum-generating means allowing the powder to be transported pneumatically and under vacuum in this distribution duct.

To make it easier to reuse the carrier gas used in the distribution circuit, this distribution circuit takes the form of a closed circuit.

In order to centralize the preparation of the powder with which the various machines of the installation are stocked, the preparation circuit comprises a powder drying device and a powder sifting device.

Finally, to compensate for the volume of the clumps of non-recyclable powder that are removed as waste by the sifting device and the volume of powder of use to the additive manufacture, the installation further comprises a device for storing a volume of fresh powder, which is connected to the device for storing the volume of feedstock powder.

BRIEF DESCRIPTION OF THE DRAWINGS

Further features and advantages of the invention will become apparent in the description which will follow. This description, which is given by way of non-limiting example, refers to the attached drawings in which.

DETAILED DESCRIPTION OF EMBODIMENTS OF THE INVENTION

Figure 1:
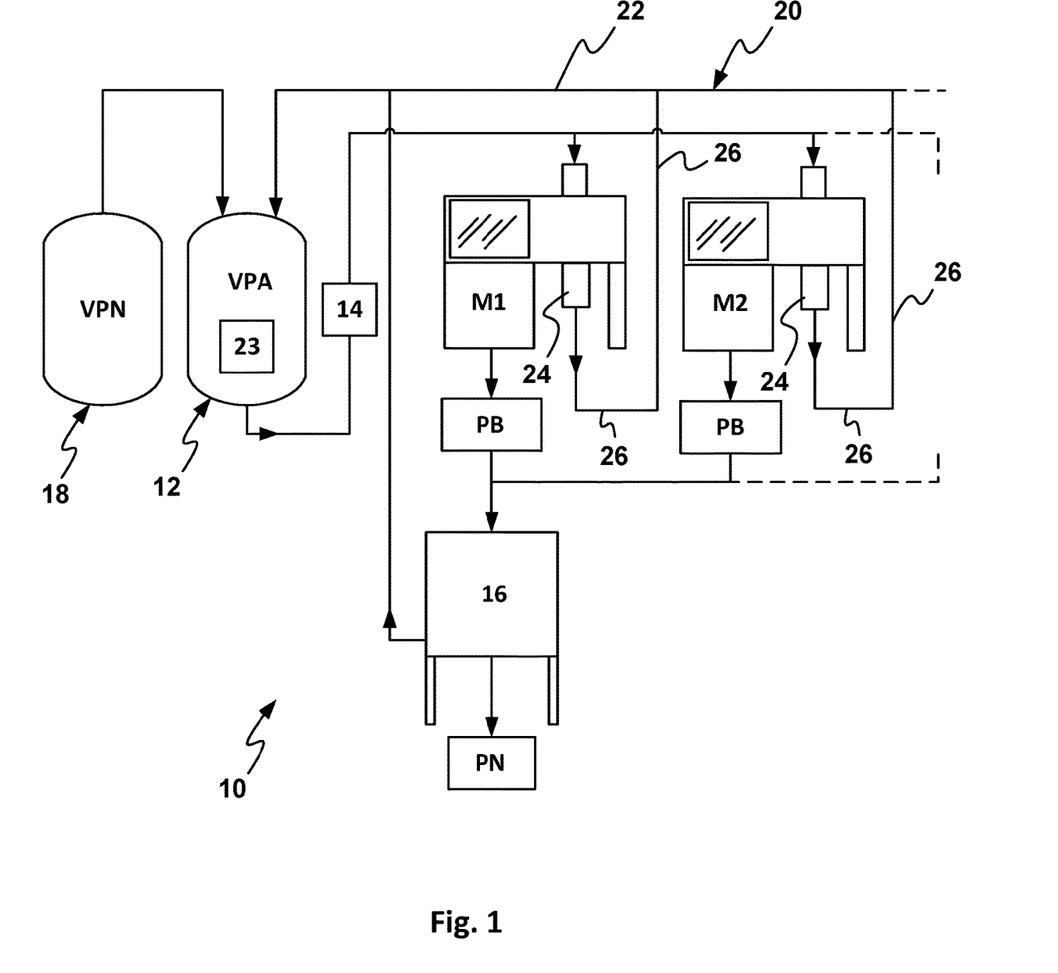
FIG. 1 is a simplified schematic depiction of a plurality of additive manufacturing machines fed with powder within a facility according to the invention.

As FIG. 1 illustrates, the invention relates to a facility 10 comprising a plurality of additive manufacturing machines M1,M2 which are to be fed with powder.

To this end, the facility 10 comprises a device 12 for storing a volume of feedstock powder VPA and a supply device 14 automatically supplying powder to the various machines M1,M2 of the facility from this volume of feedstock powder VPA.

In the known way, and as described for example in documents WO-2013/178825 and WO-2013/092757, an additive manufacturing machine M1,M2 comprises at least means of emitting a laser and/or particle beam, a device for layering powder in the work zone of the laser and/or particle beam, and means feeding the layering device with powder, for example from the powder delivered to this machine by the feed device 14.

Still in the known way, during the additive manufacture of components within each machine M1,M2, each layering device of each machine M1,M2 applies the powder in excess and moves away the excess part of the powder deposited, referred to as excess powder, in order to obtain a layer of powder that is as uniform as possible.

Once the additive manufacturing cycle within each machine M1,M2 is finished, the rough components PB are extracted from the machine M1,M2 to be cleaned and separated from the unconsolidated powder surrounding them. Specifically, the rough components PB are generally extracted from a machine M1,M2 in the container in which they were manufactured, and therefore immersed in the middle of the powder not set aside by the layering device and not consolidatable by the laser and/or particle beam.

So, the facility 10 comprises a device 16 for cleaning the rough components PB manufactured by the machines M1,M2 of the facility. This cleaning device 16 allows the rough components PB to be separated from the non-consolidated powder surrounding them and therefore allows this powder, referred to as recovered powder, to be recovered during the cleaning of these rough components PB. Once separated from the recovered powder, the cleaned components PN are sent away to a storage site or to another device.

Finally, the facility 10 further comprises a device 18 for storing a volume of fresh powder VPN which is connected to the storage device 12 that stores the volume of feedstock powder VPA. This volume of fresh powder VPN is used to restock the volume of feedstock powder VPA as necessary.

Advantageously, since the invention makes provision for the excess powder moved aside by the layering devices of the various machines M1,M2 and the recovered powder derived from the cleaning of the rough components PB manufactured to be collected and reused, the volume of fresh powder VPN is used almost solely to compensate for the volume of powder converted into rough components PB by the machines M1,M2 of the facility. Specifically, since the invention also makes provision to sift the mixture of powder derived from the volume of feedstock powder VPA before this mixture is used to feed the various machines M1,M2 of the facility, the volume of fresh powder VPN is also used to compensate for the clumps of powder rejected as waste by this sifting operation.

Figure 2:
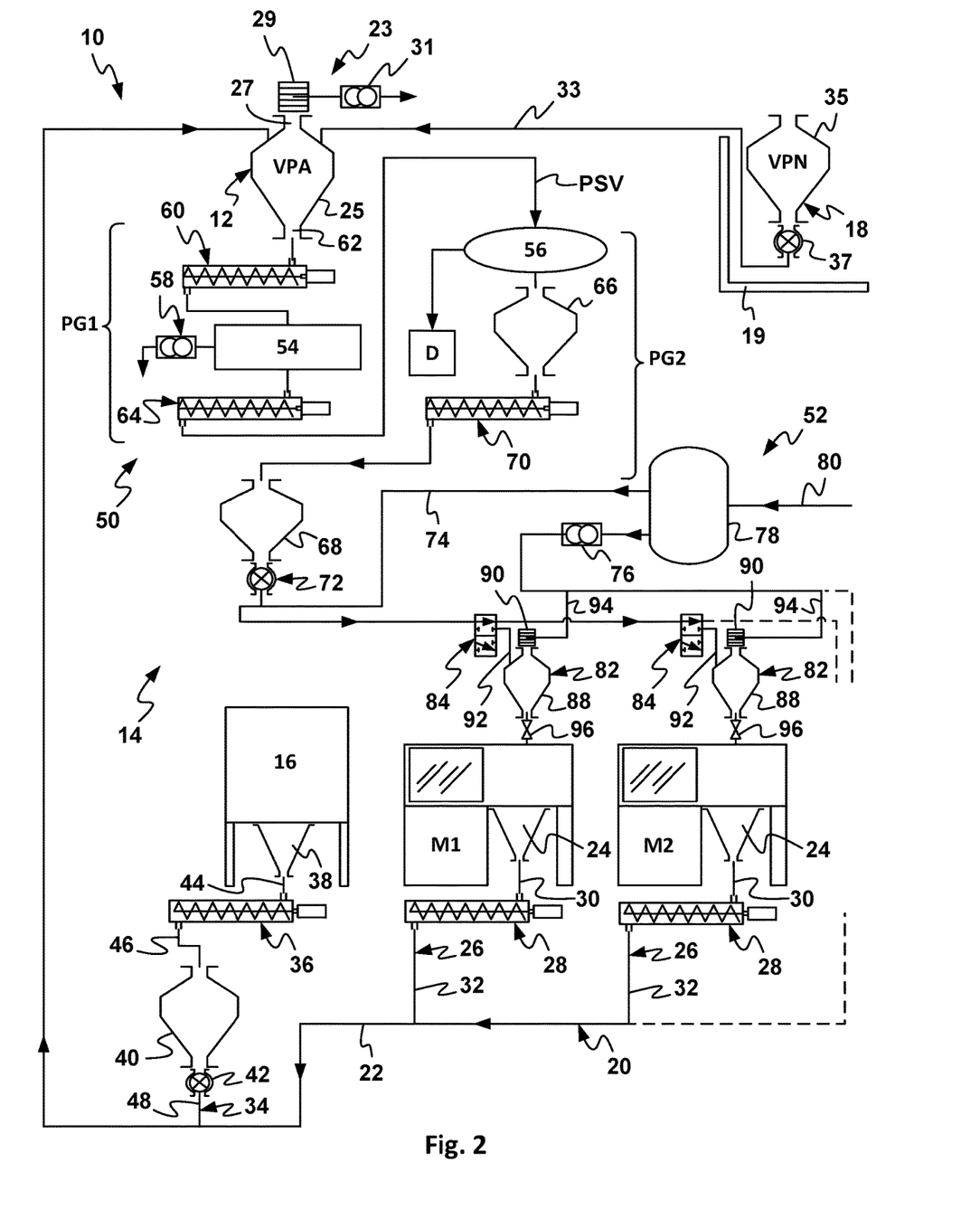
FIG. 2 is a more detailed schematic depiction of a plurality of additive manufacturing machines fed with powder within an installation according to the invention.

As illustrated in FIG. 2, since the facility 10 may be confined within a protective space 19 aimed at avoiding any leak of toxic powder into an environment frequented by operators or other individuals, this fresh powder storage device 18 is preferably arranged outside this space 19 to make it easier to restock or to handle with a view to replacing it with another storage device full of fresh powder.

According to an important feature, the facility 10 according to the invention comprises a collecting circuit 20 for collecting excess powder swept aside by each layering device of each machine M1,M2, this collecting circuit 20 allowing the excess powder collected to be transported from each additive manufacturing machine M1,M2 as far as the volume of feedstock powder VPA of the storage device 12.

By allowing the material resources used for recycling the excess powder generated by the various machines M1,M2 within the facility to be pooled, the collecting circuit 20 allows the creation of a facility 10 with machines M1,M2 which are less expensive and which remain cleaner for longer because they do not incorporate an internal system for recycling the excess powder moved aside by their layering device. In addition, the operation of the machines M1,M2 is not disrupted by vibrations in an internal recycling system.

In greater detail, the collecting circuit preferably comprises a single collecting duct 22 connecting each machine M1,M2 of the facility to the volume of feedstock powder VPA and vacuum generating means 23 allowing the excess powder collected to be sent pneumatically and under vacuum into this collection duct 22.

Vacuum transportation of the excess powder is more reliable because, in the event of a leak from the collecting duct 22, the powder being transported, which may be toxic, is kept inside the collecting circuit 20 and cannot escape to an environment in which it could be inhaled by an operator or an individual situated near the leak.

Advantageously, with regard to the cost of the facility 10, the excess powder collected is transported under atmospheric air vacuum. Specifically, since the invention also makes provision for drying the mixture of powder derived from the volume of feedstock powder VPA before this mixture is used to feed the various machines M1,M2 of the facility; there is no need to use dry air or a pure gas containing no water vapour.

For preference, because the collecting duct 22 communicates with the space 25 of the storage device 12 in which space the volume of feedstock powder VPA is stored, the vacuum generating means 23 allow the space 25 of this device to be depressed. In greater detail, because the space 25 comprises an opening 27, the vacuum generating means 23 comprise a filter for placing under depression 29 installed on the opening 27 and connected to a vacuum pump 31.

Advantageously, a feed duct 33 connecting the space 35 of the fresh powder storage device 18 to the space 25 of the feedstock powder storage device 12, the vacuum generating means 23 also allow the fresh powder to be carried pneumatically and under vacuum from the volume of fresh powder VPN toward the volume of feedstock powder VPA. In order to control the restocking of the volume of feedstock powder VPA with new powder, a new powder flow regulating device 37 such as a valve is provided between the space 35 of the fresh powder storage device 18 and the fresh powder supply duct 33.

As FIGS. 1 and 2 illustrate, because each machine M1,M2 of the facility 10 comprises an excess powder discharge 24, each discharge opening 24 of each machine M1,M2 is connected to the collecting duct 22 by its own discharge line 26. For preference, the excess powder is removed from each machine M1,M2 under gravity via its discharge opening 24 and is transported under gravity in the discharge line 26 connected to this opening.

Advantageously, each discharge line 26 from each machine M1,M2 comprises a powder flow regulating device 28 interposed between the discharge opening 24 of this machine and the collecting duct 20. Thus, the various regulating devices 28 allow the transfer of excess powder from the machines M1,M2 to the collecting circuit 20 to be halted in order to limit the running times of the vacuum generating means 23 and the electrical power consumption thereof.

In the example depicted in FIG. 2, the flow regulating devices 28 take the form of an endless screw conveyor. However, these regulating devices 28 may also be simple valves, sluice gates or any other device able to regulate the flow of a pulverulent product being transported under gravity.

More specifically, each discharge line 26 comprises an upstream duct 30 connecting a discharge outlet 24 of a machine M1,M2 to the inlet of the regulating device 28 and a downstream duct 32 connecting the outlet of the flow regulating device 28 to the collecting duct 22.

For preference, in a facility 10 according to the invention, vacuum generating means 23 allow the excess powder collected to be transported in the dilute phase in the collecting duct 22.

What is meant by transport in the dilute phase is transport with a gas circulating at a high speed in excess of 9 m/s and, for example, comprised between 15 and 35 m/s, and with a low concentration of powder, for example representing less than 10 kg of powder/kg of gas.

This transportation of the excess powder in a dilute phase is advantageous because it makes it possible to prevent blockages of powder appearing in the collecting duct 22. In addition, the gas flow rate associated with this type of transportation makes it possible to remove a bed of powder that may have settled at the bottom of the collecting duct 22.

As indicated previously, the additive manufacturing facility 10 according to the invention comprises a device 16 for cleaning the rough components PB manufactured by the machines M1,M2 of the facility, and this cleaning device 16 allows powder, referred to as recovered powder, to be recovered during the cleaning of these rough components PB. So, the cleaning device 16 is connected to the collecting circuit 20 that collects the excess powder in such a way as to introduce the recovered powder into this collecting circuit 20. In this way, the collecting duct 22 and its vacuum-generating means 23 allow the excess powder and the recovered powder to be transported towards the volume of feedstock powder VPA.

Like the additive manufacturing machines M1,M2, the cleaning device 16 is connected to the collecting duct 22 by a discharge line 34 in which the recovered powder is transported under gravity.

Advantageously, this discharge line 34 also comprises a regulating device 36 regulating the flow of recovered powder interposed between the recovered-powder discharge opening 38 of this cleaning device 16 and the collecting duct 22. Thus, and in parallel with the various devices 28 for regulating the flow of excess powder discharged by the machines M1,M2, the device 36 for regulating the flow of recovered powder also makes it possible to limit the operating time and electrical power consumption of the vacuum-generating means 23 of the collecting circuit 20.

In the example depicted in FIG. 2, the device 36 for regulating the flow of recovered powder takes the form of an endless screw conveyor. However, this regulating device 36 could also be a simple valve, a sluice gate or any other device capable of regulating the flow of a pulverulent product transported by gravity.

To supplement this, and because of the substantial volume of recovered powder discharged by the cleaning device 16 during a cycle of cleaning rough components PB, the recovered-powder discharge line 34 also comprises a buffer reservoir 40 interposed between the recovered-powder flow-regulating device 36 and the collecting duct 22, another recovered-powder flow regulating device 42 being provided at the outlet of this buffer reservoir 40 so as to control the flow of recovered powder leaving this buffer reservoir 40 and transferred toward the collecting duct 22.

In more detail, the recovered-powder discharge line 34 comprises an upstream duct 44 connecting the discharge outlet 38 of the cleaning device 16 to the inlet of the regulating device 36, an intermediate duct 46 connecting the outlet of the regulating device 36 to the inlet of the buffer reservoir 40, and a downstream duct 48 connecting the outlet of the regulating device 42 to the collecting duct 22.

In the light of what has just been described it will be appreciated that the invention makes provision for distributing to the various machines M1,M2 of the facility a mixture of fresh powder, recovered powder, and excess powder. So, because the recovered powder and the excess powder may contain clumps of powder or have a certain moisture content, the invention makes provision for preparing the powder derived from this mixture before distributing it to the machines M1,M2 of the facility.

Therefore, the feed device 14 of the facility 10 comprises a first, powder-preparation, circuit 50, followed by a second, powder-distribution, circuit 52 distributing the prepared powder to the various machines M1,M2 of the facility, the preparation circuit 50 connecting the volume of feedstock powder VPA to the distribution circuit 52, and the distribution circuit 52 connecting the preparation circuit 50 to each machine M1,M2 of the facility.

Still with a view to avoiding the use of compressed air, at least a portion PG1,PG2 of the preparation circuit 50 is set out in such a way as to transport the powder under gravity, and the preparation circuit 50 also comprises vacuum-generating means, not illustrated in FIG. 2, allowing the powder to be transported pneumatically and under vacuum, preferably using dry air, into another portion PSV of this preparation circuit 50.

Since a first step of powder preparation provided for by the invention is to dry the powder, the preparation circuit 50 comprises a powder-drying device 54.

Also, since a second step of powder preparation provided for by the invention is to sift the powder, the preparation circuit 50 comprises a powder-sifting device 56.

For preference, the sifting device 56 is situated downstream of the drying device 54 in the preparation circuit 50 because a powder containing a certain moisture content could cause malfunctioning of the sifting device 56 and, for example, slow the flow of the powder through the sifting device 56.

In order to dry the powder down to its moisture content equal to a reference setpoint, the drying device 54 may take the form of a mixer/dryer with a vertical rotor and insulating double walls. This drying device 54 may be equipped with an oil bath or hot water heating unit and with a vacuum-creating unit 58.

Advantageously, creating a vacuum in the dryer makes it possible to lower the temperature at which water vaporizes and to save time in removing the vaporized moisture.

In order to eliminate clumps or particles of powder that are for example greater than 50 microns in size, the sifting device 56 comprises a vibrating belt with a mesh opening of 50 microns, the clumps or particles of powder larger than this mesh opening being removed by the sifting device 56 as waste D.

In greater detail, in a first portion PG1 of the transportation of the powder under gravity, the preparation circuit 50 comprises a first powder-flow regulating device 60 interposed between an outlet 62 of the space 25 of the device 12 for storing the volume of feedstock powder VPA and the inlet of the drying device 54, and a second powder-flow regulating device 64 interposed between the outlet of the drying device 54 and the inlet of the sifting device 56.

By way of example, the drying device 54 operates in powder batches of around 100 litres.

Once dry, the batch of powder is transferred to the sifting device 56 via the pneumatic vacuum powder transportation portion PSV. For preference, the powder is transported in the PSV portion of the preparation circuit 50 as a dense phase.

What is meant by transport as a dense phase is transportation with a gas flowing at a low speed of below 9 m/s and, for example, of between 1 and 8 m/s, and with a high powder concentration, for example higher than 30 kg of powder/kg of gas.

Then, once the batch of powder has been dried and sifted, the prepared powder is transferred to the distribution circuit 52 via a second portion PG2 in which the powder is transported under gravity.

In more detail, in this second portion PG2 of transport under gravity of the preparation circuit 50, there is a first prepared-powder buffer reservoir 66 and a second prepared-powder metering reservoir 68, a first powder-flow regulating device 70 being interposed between the first buffer reservoir 66 and the second metering reservoir 68, and a second powder regulating device 72 being provided at the outlet of the second metering reservoir 68 and connected to the distribution circuit 52.

Of course, the various devices and reservoirs of the preparation circuit 50 are connected by suitable pipes, and the preparation circuit 50 thus formed is arranged in such a way as to allow the powder to flow under gravity in the relevant portions PG1,PG2.

In the example depicted in FIG. 2, all the powder flow regulating devices 60,64,70 of the preparation circuit 50 are endless screw conveyors with the exception of the regulating device 72 provided at the outlet of the second metering reservoir 68 which takes the form of a sluice gate. However, these regulating devices 60,64,70,72 may also adopt the form of other means known to those skilled in the art and allowing regulation of the flow of a pulverulent product.

The regulating device 72 provided at the outlet of the second metering reservoir 68 has the function of delivering a dose of prepared powder to the distribution circuit 52 so that this dose, for example of 2.5 litres, is carried to a machine M1,M2 of the facility 10 by the distribution circuit 52.

So, the distribution circuit 52 comprises a distribution duct 74 connected to the preparation circuit 50 and to each machine M1,M2 of the facility 10, and vacuum generating means 76 allowing the powder to be transported pneumatically and under vacuum in this distribution duct 74. For preference, the powder is transported pneumatically and under vacuum of dry air or of a pure and inert gas such as nitrogen in this distribution duct 74 so as to avoid any degradation of the hygrometric and particle size characteristics of the dried and sifted powder.

In order to save on carrier gas, and in particular in the case of a dried or pure and inert carrier gas such as nitrogen, the distribution circuit 52 is preferably a closed circuit.

Hence, the distribution duct 74 forms a closed loop to which the outlet of the regulating device 72 provided at the outlet of the second metering reservoir 68 of the preparation circuit 50 is connected and to which the various machines M1,M2 of the facility are connected.

In greater detail, the distribution duct 74 forms a closed loop starting at and returning to a buffer tank 78 passing via the vacuum-generating means 76. Advantageously, the buffer tank 78 is double-walled allowing it to condense any water that might be contained in the carrier gas and remove it from the distribution circuit 52. Of course, and although the distribution circuit 52 is a closed circuit, a carrier-gas feed 80 to the buffer tank 78 is also provided.

For preference, the powder is also transported in dilute phase in the distribution circuit 52. However, in the case in which the powder is transported in this distribution circuit 52 in small volumes, such as for example when the regulating device 72 provided on the outlet of the preparation circuit 50 delivers 2.5-litre doses of powder to the distribution duct 74, transportation in a semi-dilute phase is conceivable.

What is meant by a transport in a semi-dilute phase is transportation with a gas circulating at an intermediate speed, being situated for example at around 9 m/s, and with an intermediate powder concentration for example comprised between 10 and 30 kg of powder/kg of gas.

Because the powder in the process of being distributed is mixed with the carrier gas in the duct 74 of the distribution circuit 52, each machine M1,M2 of the facility is connected to this duct 74 via a separation device 82 allowing the powder to be separated from the carrier gas.

In greater detail, such a separation device 82 comprises a distributor 84 inserted into the distribution circuit 52, a receiving hopper 88 receiving the mixture of powder and of carrier gas, and a depressurizing filter 90. The distributor 84 may adopt two positions: a divert position in which it diverts the mixture of powder and of carrier gas to the receiving hopper 88 via a bypass duct 92 and a neutral position in which it allows this mixture of powder and of carrier gas to circulate in the distribution duct 74 and toward the other machines M1,M2 of the facility.

For preference, the receiving hopper 88 comprises means allowing the powder to be separated from the carrier gas through a cyclone effect, the carrier gas being conveyed back to the distribution duct 74 via a coupling 94, and the powder being stored in this receiving hopper 88 to be fed into the additive manufacturing machine to which it is connected by a powder flow regulating device 96.

More generally, the invention also covers a method for managing a powder within an additive manufacturing facility 10 as has just been described for example. Of course, this management method offers the same advantages as the facility 10 which has just been described.

Because this facility 10 comprises a plurality of additive manufacturing machines M1,M2, the management method makes provision for storing a volume of feedstock powder VPA and for automatically feeding powder to the various machines M1,M2 of the facility from this volume of feedstock powder VPA.

In the knowledge that the powder delivered to each machine M1,M2 undergoes at least one layering during the course of an additive manufacturing cycle performed in this machine M1,M2, and that this layering operation is performed by depositing the powder in excess and by moving aside the excess proportion of the powder deposited, referred to as excess powder, the management method makes provision for collecting the excess powder moved aside within each machine M1,M2 of the facility 10 and for conveying the excess powder collected from each machine M1,M2 to the volume of feedstock powder VPA.

In order to avoid leaks of powder into the environment outside the pipe used for transporting the excess powder collected, the management method makes provision for the excess powder collected at each machine M1,M2 to be transported pneumatically and under vacuum as far as the volume of feedstock powder VPA, and preferably under atmospheric air vacuum because the management method also makes provision for the powder feeding the machines of the facility to be dried.

In order to avoid the risks of a pipe used for transporting the excess powder collected becoming blocked, the management method makes provision for the excess powder collected at each machine M1,M2 to be transported in dilute phase as far as the volume of feedstock powder VPA.

In parallel with the recycling of the excess powder, the management method also makes provision for reintroducing a recovered powder derived from the cleaning of the rough components PB manufactured by the machines M1,M2 of the facility into the volume of feedstock powder VPA.

Still in order to avoid leaks of powder into the environment outside the circuit used for transporting the powder, the management method makes provision for the powder to be transported under gravity or pneumatically and under vacuum from the volume of feedstock powder VPA as far as each machine M1,M2 of the facility.

In addition, when the powder is transported pneumatically and under vacuum from the volume of feedstock powder VPA as far as each machine M1,M2 of the facility, the method makes provision for the use of dry air or an inert gas as a carrier gas in order to avoid increasing the mositure content of the powder.

In order to restock the volume of feedstock powder VPA when necessary, the management method makes provision for introducing fresh powder into the volume of feedstock powder VPA.

It is evident from the foregoing that the management method according to the invention makes provision for various machines M1,M2 of a facility to be fed with a mixture of fresh powder, recovered powder derived from the cleaning of the rough components PB manufactured by these various machines, and of excess powder removed by the various machines of the facility.

So, and in order to supply the machines M1,M2 of the facility with a powder that has the required qualities in terms of particle size, the management method makes provision for sifting the powder between the volume of feedstock powder VPA and each machine M1,M2 of the facility.

Further, with the view to providing the machines M1,M2 of the facility with a powder that has the required qualities in terms of moisture content, the management method makes provision for sifting the powder between the volume of feedstock powder VPA and each machine M1,M2 of the facility.

The invention claimed is:

1. A method for managing powder within an additive-manufacturing facility including a plurality of additive-manufacturing machines, the method comprising:
storing a volume of feedstock powder;
automatically feeding the plurality of machines of the facility with powder from the volume of feedstock powder, wherein the powder delivered to each of the plurality of machines undergoes at least one layering during an additive-manufacturing cycle carried out in the machine, wherein the at least one layering takes place with powder being deposited in excess, and wherein the excess powder is removed from each of the plurality of machines of the facility;
collecting the excess powder removed from each of the plurality of machines of the facility;
conveying the collected excess powder removed from each of the plurality of machines to the volume of feedstock powder;
cleaning rough components manufactured by the plurality of machines of the facility to obtain recovered powder;
introducing the recovered powder into the volume of feedstock powder, wherein the conveying the collected excess powder to the volume of feedstock powder and the introducing the recovered powder into the volume of feedstock powder convey the excess powder and the recovered powder via a single collection circuit to the volume of feedstock powder;
obtaining a mixture of fresh powder, the recovered powder, and the excess powder; and
preparing the obtained mixture of the fresh powder, the recovered powder, and the excess powder before the prepared mixture is distributed, in the feeding, to the plurality of machines of the facility,
wherein the preparing comprises (a) drying, using a dryer, the obtained mixture of the fresh powder, the recovered powder, and the excess powder, so that a moisture content of the obtained mixture of the fresh powder, the recovered powder, and the excess powder is controlled to be no greater than a reference value, and (b) sifting, using a sifter, the dried obtained mixture of the fresh powder, the recovered powder, and the excess powder, so that clumps or particles of the dried obtained mixture of the fresh powder, the recovered powder, and the excess powder that are greater than a predetermined size are removed as waste, and wherein the sifting is carried out downstream of the drying so as to prevent powder having a moisture content that could cause malfunctioning of the sifter from being sifted,
wherein the single collection circuit conveys powder in a dilute phase, and
wherein powder is transported from the dryer to the sifter in a dense phase.

2. The method of claim 1, wherein in the conveying of the collected excess powder removed from each of the plurality of machines of the facility to the volume of feedstock powder, the collected excess powder is transported pneumatically and under vacuum to the volume of feedstock powder.

3. The method of claim 2, wherein, in the conveying of the collected excess powder removed from each of the plurality of machines of the facility to the volume of feedstock powder, the collected excess powder is transported in a dilute phase to the volume of feedstock powder.

4. The method of claim 1, wherein, in the feeding of the plurality of machines of the facility, the powder from the volume of feedstock powder is transported from the volume of feedstock powder to each of the plurality of machines of the facility utilizing gravity or is so transported pneumatically and under vacuum.

5. The method of claim 4, wherein, in the feeding of the plurality of machines of the facility, the powder is transported with dry air or an inert gas when transported pneumatically and under vacuum from the volume of feedstock powder to each of the plurality of machines of the facility.

6. The method of claim 1, further comprising a step of introducing the fresh powder into the volume of feedstock powder.

7. The method of claim 1, wherein the obtaining the mixture of the fresh powder, the recovered powder, and the excess powder comprises obtaining the mixture from the volume of feedstock powder, and
wherein the preparing is carried out using a preparation circuit arranged between the volume of feedstock powder and the plurality of machines of the facility.

8. The method of claim 1, wherein the dilute phase transports powder at a speed within a range of 15 to 35 m/s and with a powder concentration of less than 10 kg of powder per kg of gas,
wherein the preparing is carried out using a preparation circuit arranged between the volume of feedstock powder and the plurality of machines of the facility,
wherein the preparation circuit comprises the dryer and the sifter,
wherein the dense phase transports powder at a speed within a range of 1 to 8 m/s and with a powder concentration of higher than 30 kg of powder per kg of gas, and
wherein the sifting sifts the dried obtained mixture of the fresh powder, the recovered powder, and the excess powder that was transported from the dryer to the sifter.

9. The method of claim 8, wherein the dryer comprises (a) a vertical rotor and (b) either an oil bath or a hot water heating unit, and
wherein the drying comprises mixing using the vertical rotor and drying using either the oil bath or the hot water heating unit.

10. The method of claim 9, wherein the sifter comprises a vibrating belt with a mesh opening.

11. The method of claim 10, wherein the preparing further comprises (a) regulating, with a powder flow regulating device, powder flow between the volume of feedstock powder and the dryer, (b) regulating, with a powder flow regulating device, powder flow between the dryer and the sifter, and (c) regulating, with a powder flow regulating device, powder flow downstream of the sifter.

12. The method of claim 11, wherein the feeding comprises placing each of the plurality of machines in a selected one of (a) a diversion state in which the prepared mixture and gas is received by a receiving hopper of the machine and (b) a neutral state in which the prepared mixture and gas is not received by the receiving hopper of the machine but instead continues onward to another of the plurality of machines.

13. The method of claim 1, wherein the obtaining the mixture of the fresh powder, the recovered powder, and the excess powder comprises:
    (1) introducing the fresh powder to the volume of feedstock powder; and
    (2) mixing the fresh powder, the recovered powder, and the excess powder.

14. The method of claim 13, wherein the single collection circuit comprises a single collecting duct that (a) receives the excess powder from each of the plurality of machines and (b) receives the recovered powder, whereby the excess powder and the recovered powder are conveyed via the single collecting duct to the volume of feedstock powder,
    wherein a feed duct connects a fresh powder storage to the volume of the feedstock powder, whereby the fresh powder is carried via the feed duct from the fresh powder storage to the volume of the feedstock powder, and
    wherein the volume of feedstock powder is external to the plurality of machines.

15. The method of claim 14, wherein the obtaining the mixture of the fresh powder, the recovered powder, and the excess powder comprises obtaining the mixture from the volume of feedstock powder, and
    wherein the preparing is carried out using a preparation circuit arranged between the volume of feedstock powder and the plurality of machines of the facility.

16. The method of claim 15, wherein the volume of feedstock powder, the preparation circuit, and the plurality of machines are disposed within a protective space configured to avoid powder leakage, and
    wherein the fresh powder storage is disposed outside the protective space.

17. The method of claim 1, wherein the volume of feedstock powder and the plurality of machines are disposed within a protective space configured to avoid powder leakage, and
    wherein a fresh powder storage that provides the fresh powder is disposed outside the protective space.

* * * * *